Jan. 4, 1927.

G. CONSTANTINESCO 1,613,344

POWER TRANSMISSION

Filed March 24, 1924   2 Sheets-Sheet 1

Inventor,
G. Constantinesco
by
atty

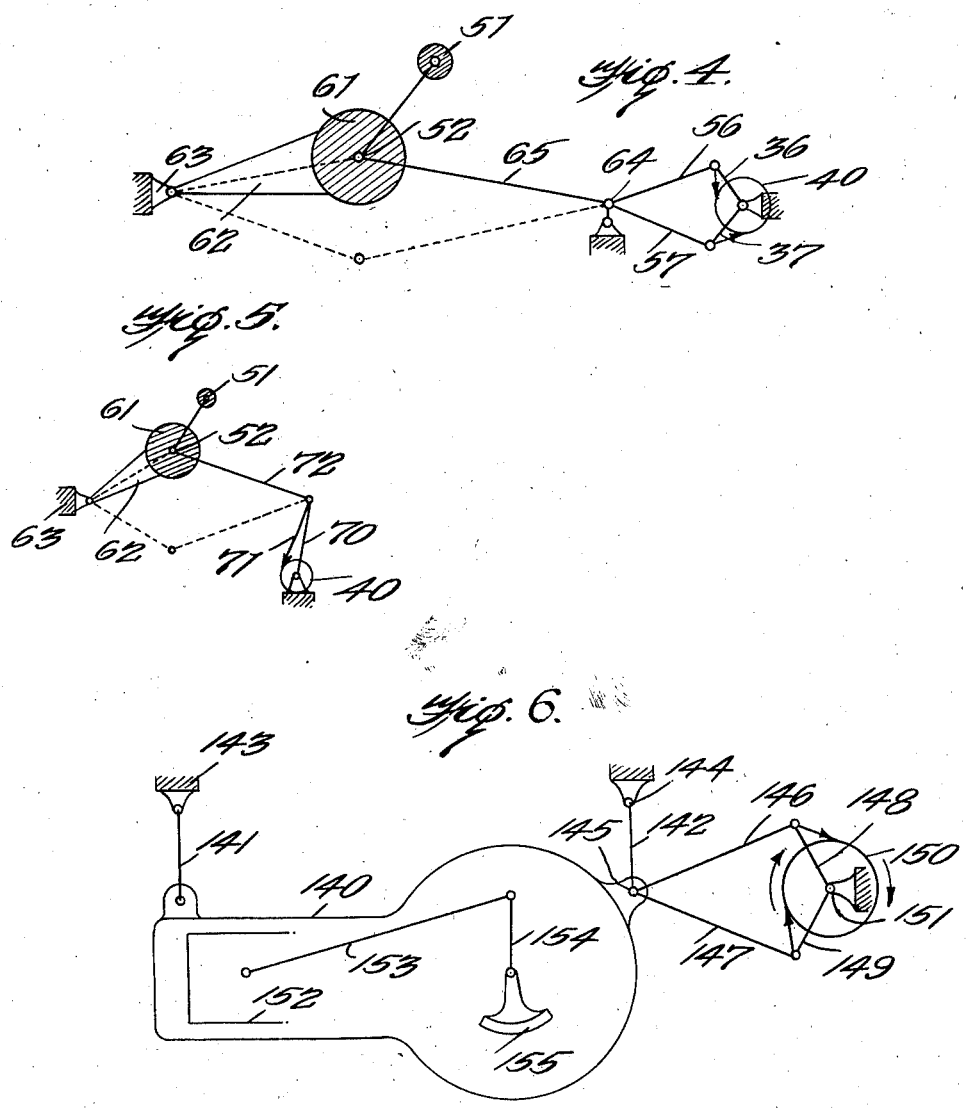

Patented Jan. 4, 1927.

1,613,344

UNITED STATES PATENT OFFICE.

GEORGE CONSTANTINESCO, OF WEYBRIDGE, ENGLAND.

POWER TRANSMISSION.

Application filed March 24, 1924, Serial No. 701,539, and in Great Britain April 14, 1923.

In my British patent specification No. 185,022 I have shown a new method of transmitting power from a prime mover to a shaft which is to be rotated against a variable resisting torque by splitting alternating or sinusoidal motion derived from a steadily rotating shaft into component alternating motion of the same frequency; one component motion being caused to give alternating motion to a mass, while another is caused to give alternating motion to a pair of unidirectional driving devices working in opposite phase and rotating a shaft.

The main features of the invention are the mode in which reciprocating motion is derived from the prime mover and the way in which this reciprocating motion is apportioned between two inertial masses which take the place of the single inertial mass as described in my prior specifications. The uniform motion of the prime mover is according to my invention split between the centre of gravity of these two masses and the driven shaft according to the torque on or the speed of the shaft. For example, the prime mover causes an unbalanced mass to gyrate about an axis which is suspended by links from a fixed point. This axis is linked to a second mass which is capable of oscillating about another fixed point. The result, as will be explained hereafter, is that the motion of the prime mover is distributed between the centre of gravity of the two masses and the driven shaft. If, for instance, the torque opposing the motion of the driven shaft becomes infinite so that the shaft does not rotate, the travel of the centre of gravity of the two masses is a maximum. If there is no torque the motion of their centre of gravity is a minimum.

Referring to the accompanying drawings:—

Figure 4 shows another form of the invention utilizing a rotating mass and giving quadruple frequency impulses in the rotor.

Figure 5 shows a form in which a rotating mass is employed in combination with a ratchet moving at double the frequency of the prime mover;

Figure 6 shows the application of the invention to transmission gear combined with a single cylinder internal combustion engine.

Figure 1:
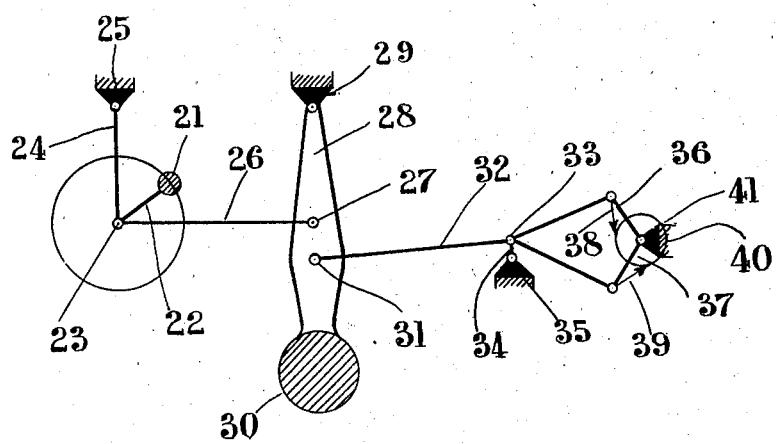
Figure 1 shows one form of the invention in which a rotating mass is provided.

In the form of the invention shown in Figure 1 a rotating mass 21 at the end of a crank 22 is caused by a Cardan joint or other suitable means to gyrate or revolve about a pivot 23 suspended by a link 24 from a fixed pivot 25. The pivot 23 is connected by a rod 26 to a pivot 27 on a swinging lever 28 pivoted at a fixed point 29 and carrying at its end a mass 30. A second pivot 31 on the lever 28 is connected by a rod 32 to a pivot 33 supported on a stabilizing link 34 pivoted at a fixed point 35. The driving pivot 33 is connected to a pair of oscillating members 36, 37 carrying ratchet devices 38, 39 driving a rotor 40 pivoted at a fixed point 41.

The gyrations of the mass 21 set up by the prime mover, which is connected to the pivot 23 by the Cardan joint or other flexible coupling, cause this pivot to oscillate. These oscillations are communicated to the mass 30 and the motion of the prime mover is thus split between the centre of gravity of the masses 30 and 21 and the unidirectional driving devices connected to the driving pivot 33, the splitting or division taking place according to the torque on or the speed of the rotor 40. Thus, for example, if the torque against the rotor 40 becomes infinite so that the rotor cannot rotate, the lever 28 and the axis 23 becomes fixed. But the mass 21 continues to gyrate about this axis, and the lateral motion of the centre of gravity of the masses 21 and 30 is at its maximum. If, however, this torque vanishes, the mass 21 still gyrates, but the lever 28 now swings. The lateral motion of the centre of gravity of the masses 21 and 30 is then zero or nearly so, and the whole motion of the prime mover is transferred to the rotor. The same action in principle occurs in all the succeeding embodiments of the invention. According to my prior specifications the motion of the prime mover was divided between a single periodically moving mass and a rotor; in the present case it is divided between the centre of gravity of two periodically moving masses and a rotor.

Figure 2:
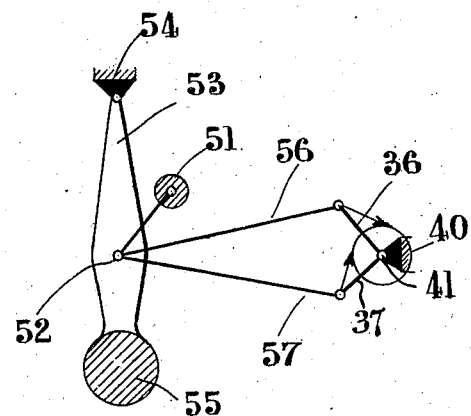
Figure 2 shows another modification utilizing a rotating mass.

In the form of the invention shown in Figure 2 the mass 51 is rotated about the pivot 52 on a lever 53 pivoted at a fixed point 54 and carrying at its lower end a mass 55. The pivot 52 is directly connected by the rods 56, 57 with oscillating members 36, 37 driving the rotor 40.

Figure 3:
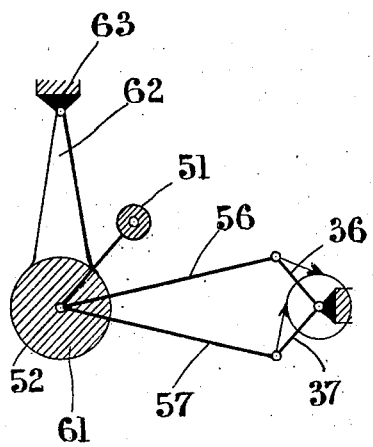
Figure 3 shows a modified form.

A further form is shown in Figure 3 where the rotating mass 51 rotates about an axis 52 at which is also situated a mass 61. The mass 61 is carried by an arm 62 pivoted at a fixed point 63. The connecting rods 56, 57 which drive the oscillating members 36, 37 are directly connected to the pivot 52.

In the form of the invention shown in Figure 4, the rotating mass 51 is rotated about the axis 52 at which is also situated the mass 61 carried by an arm 62 pivoted at a fixed point 63, so that the mean position of the mass 61 is situated in the line between the pivot 63 and the driving pivot 64. The driving pivot is connected by a link 65 with the pivot 52 and drives the oscillating members 36, 37 through connecting rods 56, 57 giving four impulses to the rotor for each revolution of the driving shaft.

The dotted lines in this case show the extreme lower position of the pivot 52.

The form of the invention shown in Figure 5 is similar to that shown in Figure 4 with the exception that the arm 70 carries a single ratchet device 71 so placed that two impulses are given to the rotor at each oscillation of the mass 61, the pivot 52 being directly connected to the oscillating member by the connecting rod 72.

In the form of the invention shown in Figure 6, the crankcase 140 of a single cylinder internal combustion engine is supported by links 141, 142 from fixed points 143, 144 and is connected through the pivot 145 by connecting rods 146, 147 with oscillating members 148, 149 carrying ratchet devices driving the rotor 150 which turns about the fixed axis 151. The piston 152 of the engine is connected by the usual connecting rod 153 with a crank 154, a balancing mass 155 being provided to balance the crank. In this case the motion of the prime mover is split between the total mass of the engine acting at its centre of gravity and the ratchet devices driving the rotor 150.

I claim:

1. An automatic power gear in which power is transmitted from a prime mover to a driven shaft rotating under varying torque or speed, comprising in combination a freely pivoted shaft continuously rotated by the prime mover, a mass eccentrically mounted on the said pivoted shaft, whereby the shaft is caused to oscillate about its pivot, a second pivoted mass operatively connected to the said pivoted shaft, a driven shaft, unidirectional means for actuating the said driven shaft, and an operative connection between the said second pivoted mass and the said undirectional means.

2. An automatic power transmission gear for transmitting motion from a steadily rotating shaft to a shaft under varying torque or speed, comprising in combination a mass caused to gyrate about an axis, means for pivoting the said axis so as to enable the gyrations of the said mass to cause it to oscillate about a fixed point, an oscillating mass, means for connecting the said oscillating mass to the said axis so that they move together, and driving means actuated by the oscillating mass, said driving means giving unidirectional rotation impulses to the shaft, such impulses being of varying amplitude but constant frequency when the revolutions of the prime mover remain constant.

3. An automatic power transmission gear for transmitting motion from a steadily rotating shaft to a shaft rotating under varying torque or speed, comprising in combination a mass caused to gyrate about an axis, means for pivoting the said axis so as to enable the gyrations of the said mass to cause it to oscillate about a fixed point, a second oscillating mass for operative connection between the said oscillating mass and the said axis so that they move together, and driving means actuated by the second mass, said driving means giving unidirectional rotation to the shaft and including a stabilizing link oscillating about a fixed point.

4. An automatic power transmission gear for transmitting motion from a steadily rotating shaft to a shaft rotating under varying torque or speed, comprising in combination a mass caused to gyrate about an axis, the said axis being carried by a second mass which is itself carried by an arm pivoted to a fixed point about which it is caused to oscillate by the movement of the said mass, a link connecting the said axis to a stabilizing link from which the unidirectional driving means is actuated, said link and said arm forming a toggle which causes the stabilizing link to oscillate with double the frequency of the oscillations of the said second mass, and driving means connected to the stabilizing link, giving unidirectional movement to the rotor.

In testimony whereof I affix my signature.

GEORGE CONSTANTINESCO.